United States Patent
Bauer et al.

(10) Patent No.: US 9,115,644 B2
(45) Date of Patent: Aug. 25, 2015

(54) TURBOCHARGER SYSTEM INCLUDING VARIABLE FLOW EXPANDER ASSIST FOR AIR-THROTTLED ENGINES

(75) Inventors: Karl-Heinz Bauer, Morristown, NJ (US); Syed Shahed, Morristown, NJ (US); Krishnamurthy Vaidyanathan, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 222 days.

(21) Appl. No.: 13/380,983

(22) PCT Filed: Jun. 28, 2010

(86) PCT No.: PCT/US2010/040144
§ 371 (c)(1),
(2), (4) Date: Mar. 12, 2012

(87) PCT Pub. No.: WO2011/002697
PCT Pub. Date: Jan. 6, 2011

(65) Prior Publication Data
US 2012/0174577 A1    Jul. 12, 2012

Related U.S. Application Data

(60) Provisional application No. 61/222,766, filed on Jul. 2, 2009.

(51) Int. Cl.
*F02B 37/16* (2006.01)
*F02D 9/02* (2006.01)
(Continued)

(52) U.S. Cl.
CPC ............... *F02B 37/14* (2013.01); *F02B 37/10* (2013.01); *F02B 37/166* (2013.01); *F02B 37/18* (2013.01);
(Continued)

(58) Field of Classification Search
CPC ...... F02B 29/0418; F02B 37/10; F02B 37/14; F02B 37/166; F02B 37/18; F02B 37/24; F02D 2009/0283; F02D 23/00; F02D 9/02; Y02T 10/144

USPC ........................ 60/607, 605.1, 611–612, 600; 123/562–563, 565, 679
See application file for complete search history.

(56) References Cited

U.S. PATENT DOCUMENTS 3,356,289 A    12/1967    Plotkowiak
3,756,739 A     9/1973    Boussuges
(Continued)

FOREIGN PATENT DOCUMENTS

CN    2469385 Y    1/2002
DE    32 05 722    8/1983
(Continued)

OTHER PUBLICATIONS

International Search Report and Written Opinion for International Application No. PCT/US2011/028015, mailed Sep. 20, 2011.
(Continued)

*Primary Examiner* — Thai Ba Trieu
*Assistant Examiner* — Paul Thiede
(74) *Attorney, Agent, or Firm* — John C. James (57) ABSTRACT

A turbocharger system for an air-throttled engine includes a variable flow expander (VFE) in the intake air conduit system that supplies intake air to the engine. At part-load operation, the VFE expands the air by an amount that is controllable, and thus regulates the air flow as needed by the engine. The power extracted by the VFE from the intake air flow is fed to the turbocharger, which helps to achieve quicker turbocharger response and improve scavenging of exhaust gases from the engine. The VFE can be a variable expansion ratio turbine.

13 Claims, 5 Drawing Sheets

(51) Int. Cl.

| | | |
|---|---|---|
| *F02B 37/10* | (2006.01) | |
| *F02D 23/00* | (2006.01) | |
| *F02B 37/14* | (2006.01) | |
| *F02B 37/18* | (2006.01) | |
| *F02B 37/24* | (2006.01) | |
| *F02B 29/04* | (2006.01) | |

(52) U.S. Cl.
CPC . *F02B 37/24* (2013.01); *F02D 9/02* (2013.01); *F02D 23/00* (2013.01); *F02B 29/0418* (2013.01); *F02D 2009/0283* (2013.01); *Y02T 10/144* (2013.01)

(56) References Cited

U.S. PATENT DOCUMENTS

| | | | |
|---|---|---|---|
| 4,177,005 | A | 12/1979 | Bozung et al. |
| 4,439,983 | A | 4/1984 | Gertz |
| 4,700,542 | A | 10/1987 | Wang |
| 4,849,897 | A * | 7/1989 | Ciccarone ............ 701/111 |
| 5,092,126 | A | 3/1992 | Yano |
| 5,394,848 | A | 3/1995 | Tsutsumi et al. |
| 5,492,103 | A * | 2/1996 | Goto ................ 123/564 |
| 5,544,484 | A | 8/1996 | Voss et al. |
| 5,559,379 | A | 9/1996 | Voss |
| 5,818,117 | A | 10/1998 | Voss et al. |
| 5,904,045 | A | 5/1999 | Kapich |
| 6,050,775 | A | 4/2000 | Erdmann et al. |
| 6,094,909 | A | 8/2000 | Weber et al. |
| 6,273,076 | B1 * | 8/2001 | Beck et al. ............ 123/679 |
| 6,276,139 | B1 | 8/2001 | Moraal et al. |
| 6,584,963 | B2 | 7/2003 | Arnold |
| 6,817,173 | B2 | 11/2004 | Paffrath et al. |
| 6,868,840 | B2 * | 3/2005 | Lewallen ............ 123/563 |
| 7,152,393 | B2 | 12/2006 | Hergemöller et al. |
| 7,178,492 | B2 * | 2/2007 | Coleman et al. ......... 123/90.15 |
| 7,490,594 | B2 * | 2/2009 | Van Dyne et al. ........ 123/561 |
| 2002/0089310 | A1 | 7/2002 | Shimizu et al. |
| 2003/0014973 | A1 | 1/2003 | Mazaua et al. |
| 2003/0140630 | A1 | 7/2003 | Baeuerle et al. |
| 2003/0167751 | A1 | 9/2003 | Paffrath et al. |
| 2004/0187852 | A1 | 9/2004 | Kawamura et al. |
| 2004/0250539 | A1 | 12/2004 | Cueman et al. |
| 2005/0150210 | A1 | 7/2005 | Hergemoller et al. |
| 2006/0138995 | A1 | 6/2006 | Sugita et al. |
| 2007/0007771 | A1 | 1/2007 | Biddle et al. |
| 2007/0033939 | A1 * | 2/2007 | Wang et al. ............ 60/612 |
| 2007/0062192 | A1 | 3/2007 | Weber et al. |
| 2007/0107429 | A1 | 5/2007 | Squires |
| 2008/0031750 | A1 | 2/2008 | Gomilar et al. |
| 2008/0095610 | A1 | 4/2008 | Bosen |
| 2008/0230618 | A1 | 9/2008 | Gawthrop |
| 2009/0060719 | A1 | 3/2009 | Haugen |
| 2010/0060013 | A1 | 3/2010 | Csefko |
| 2011/0094230 | A1 | 4/2011 | Finkenrath et al. |
| 2011/0100010 | A1 | 5/2011 | Freund et al. |
| 2011/0241344 | A1 | 10/2011 | Smith et al. |
| 2011/0265882 | A1 | 11/2011 | Reyenga et al. |
| 2011/0271936 | A1 | 11/2011 | Reyenga et al. |
| 2012/0107089 | A1 | 5/2012 | Vaidyanathan et al. |
| 2014/0041623 | A1 | 2/2014 | Beresewicz et al. |

FOREIGN PATENT DOCUMENTS

| | | | |
|---|---|---|---|
| DE | 199 37 781 | A1 | 2/2001 |
| EP | 0 147 740 | A2 | 12/1984 |
| EP | 0 344 902 | A2 | 12/1989 |
| EP | 0 360 569 | A2 | 3/1990 |
| EP | 0 609 674 | A2 | 8/1994 |
| EP | 1 158 141 | A2 | 11/2001 |
| EP | 0 770 189 | B1 | 2/2002 |
| EP | 1 722 080 | A2 | 11/2006 |
| GB | 2457326 | A | 8/2009 |
| JP | 51-143122 | | 12/1976 |
| JP | 60-182316 | A | 9/1985 |
| JP | 01-227803 | A | 9/1989 |
| JP | 04-241704 | A | 8/1992 |
| JP | 05-332158 | A | 12/1993 |
| JP | 2004-308646 | A | 11/2004 |
| JP | 2005-188348 | A | 7/2005 |
| JP | 2006-105075 | A | 4/2006 |
| JP | 2006 214325 | A | 8/2006 |
| JP | 2008-157150 | A | 7/2008 |
| KR | 20060055430 | A | 5/2006 |
| KR | 2006-0074848 | A | 7/2006 |
| NL | 1022429 | | 7/2004 |
| WO | WO 92/09800 | A1 | 6/1992 |
| WO | WO 96/04487 | A1 | 2/1996 |
| WO | WO 97/38212 | A1 | 10/1997 |
| WO | WO 2009/092670 | A1 | 7/2009 |
| WO | WO 2010/043910 | A1 | 4/2010 |
| WO | WO 2011/139725 | A2 | 11/2011 |

OTHER PUBLICATIONS

International Search Report for Application No. PCT/US2011/034018 dated Dec. 13, 2011.
International Search Report and Written Opinion for International Application No. PCT/US2011/034059, mailed Jan. 5, 2012.
Eichhorn, et al., "Throttle Loss Recovery Using a Variable Geometry Turbine," SAE International, published May 5, 2010, 19 pages.
Guzzella, et al.; Swiss Federal Institute of Technology; Recuperative Throttling of SI Engines for Improved Fuel Economy; 2001-01-0514; 2004 SAE International (6 pgs.).
Müller, et al.; DaimlerChrysler AG, Research Body and Powertrain and University of Karlsruhe, Institute for Thermal Turbomachinery; *Using the Centrifugal Compressor as a Cold Air Turbine*; 2006 DaimlerChrysler AG; pp. 1-13.
Onder, et al.; Measurement and Control Laboratory, Swiss Federal Institute of Technology; *Modelling and Control of an Active Throttle for SI Engines*; IFAC Advances in Automotive Control; Salerno, Italy, 2004; pp. 155-160.
Tomić, et al.; University of Belgrade, Faculty of Mechanical Engineering; *Spark Ignition Engine Part Load Fuel Economy Improvement: Numerical Consideration*; FME Transactions (2003); pp. 21-26; vol. 31, No. 1.
Extended European Search Report from European Application No. 08150565.3, dated Jul. 7, 2008.
International Preliminary Report on Patentability and Written Opinion from International Application No. PCT/US2010/040144, issued Jan. 4, 2012.
Eichhorn, R.H.L.; Boot, M.D.; Luijten, C.C.M.; Waste Energy Driven Air Conditioning Systems (WEDACS); Copyright 2009 SAE International; pp. 1-16.
Chinese Office Action for Application No. PCT/201080039785.3, dated Jul. 22, 2013.
European Search Report for Application No. EP 10 79 4594 dated Apr. 29, 2014.
Office Action for European Application No. EP 10 794 594.1 dated Jun. 5, 2014.
International Search Report for Application No. PCT/US2010/040144 dated Feb. 15, 2011.
International Search Report and Written Opinion for Application No. PCT/US2012/036294 dated Aug. 27, 2012.
International Search Report and Written Opinion for Application No. PCT/US2011/033404 dated Dec. 19, 2011.
International Search Report and Written Opinion for Application No. PCT/US2011/033413 dated Jan. 5, 2012.
International Search Report and Written Opinion for Application No. PCT/US2011/033419 dated Jan. 6, 2012.
International Search Report and Written Opinion for Application No. PCT/US2010/040342 dated Feb. 15, 2011.

* cited by examiner

TURBOCHARGER SYSTEM INCLUDING VARIABLE FLOW EXPANDER ASSIST FOR AIR-THROTTLED ENGINES

BACKGROUND OF THE INVENTION

The present application relates generally to turbocharger systems. More particularly, the application relates to turbocharger systems in which the dynamic performance of the turbocharger needs to be augmented with additional energy during certain transient operating conditions. Turbocharger systems in accordance with the present disclosure are applicable to all air-throttled engines (e.g., spark-ignition engines burning any type of fuel such as gasoline, ethanol, methanol, CNG, LNG, or LPG, and non-spark-ignition engines such as homogeneous charge compression ignition (HCCI) engines) equipped with a throttling device in the intake air system for air flow control.

The performance of turbocharged engines with throttled air flow systems poses several challenges. One such challenge is a result of the low amount of exhaust energy when the engine operates in a part-throttle mode, which leads to the turbine being unable to rotate fast enough, resulting in restriction of exhaust outflow. This imposes an unacceptable back-pressure on the engine and leads to consequential performance penalties. Another challenge is the adverse impact on the dynamic performance of the engine. This phenomenon is due to "turbo lag", which refers to the inability of the turbocharger to increase its speed quickly enough under certain conditions, when the engine so demands. One such condition is when the engine is operating at a part-throttle mode and the throttle is suddenly moved to a fully open condition. In part-throttle operation, the exhaust flow rate and exhaust bound energy are very small. Hence, the turbine of the turbocharger rotates relatively slowly and thus the compressor provides very slightly boosted air. When the throttle is suddenly opened to produce more power from the engine, the turbocharger is unable to speed up quickly enough to be able to provide the demanded air flow. This slow response leads to a slow increase in engine power, causing inconvenience to the user.

BRIEF SUMMARY OF THE DISCLOSURE

In accordance with the present disclosure, a variable flow expander (VFE) is provided in the intake air conduit system that supplies intake air to the engine. The VFE can comprise a variable expansion ratio turbine. At part-load operation, the VFE expands the air by an amount that is controllable, and thus regulates the air flow as needed by the engine. The power extracted by the VFE from the intake air flow is fed back to the turbocharger, which helps to achieve quicker turbocharger response. Additionally, the power fed to the turbocharger can help to improve scavenging of exhaust gases from the engine's combustion chambers, thereby reducing back-pressure and improving engine performance, particularly during part-load operation.

In one embodiment disclosed herein, a turbocharger system is described for an air-throttled internal combustion engine having an intake air conduit system for supplying intake air to the engine and an exhaust conduit system for exhausting combustion gases from the engine. The turbocharger system comprises a turbocharger including a compressor disposed in the intake air conduit system and operable for compressing air received from the intake air conduit system and supplying the compressed air through the intake air conduit system to the engine, and a turbine disposed in the exhaust conduit system and operable for expanding exhaust gases received from the exhaust conduit system so as to extract power from the exhaust gases, the turbine being mechanically coupled to the compressor for rotatably driving the compressor. The system includes a variable-flow expander (VFE) mechanically coupled to the turbocharger and arranged in the intake air conduit system in parallel with the compressor. The VFE comprises a variable expansion ratio turbine that extracts power from air flowing in the intake air conduit system and uses that power to assist the rotation of the turbocharger. The variable expansion ratio turbine is controllable to regulate the flow rate of air therethrough and thereby vary an amount of expansion of the air. The system further comprises an apportioning valve arranged in the intake air conduit system upstream of the compressor and the VFE. The apportioning valve is variably positionable for variably apportioning the air between the compressor and the VFE.

In one embodiment, the apportioning valve is structured and arranged to be positionable in a first position, in a second position, and in a plurality of positions therebetween. In the first position a majority of the mass flow rate of the air flowing in the intake conduit system is supplied to the VFE and thus bypasses the compressor. In the second position a majority of the mass flow rate of the air flowing in the intake conduit system is supplied to the compressor and thus bypasses the VFE.

In accordance with a further embodiment, the turbocharger system also includes a bypass passage connecting a portion of the air intake conduit system downstream of the compressor and the VFE with a portion of the air intake conduit system upstream of the apportioning valve, and a bypass valve disposed in the bypass passage. The bypass valve is movable between open and closed positions respectively allowing and preventing air flow through the bypass passage. The bypass valve can also serve as a backup throttle for the intake system, in the event that other components of the turbocharger system should fail.

In the present specification, references to "air" and "air-throttled" do not limit the invention to applications in which pure air is flowing in the intake air conduit system, but also include applications in which the air is mixed with another fluid such as fuel for an internal combustion engine. Thus, the compressor can compress a mixture of air and fuel, and the VFE can expand a mixture of air and fuel, if desired in a particular application. Furthermore, the present invention can also be applied to systems in which the fluid received by the compressor and VFE is a gas that does not contain any air at all. The fundamental fluid-dynamic and thermodynamic processes of the invention, by which the VFE can extract energy from the fluid stream and use it to assist rotation of the compressor under certain operating conditions, apply to virtually any fluid that is expandable across the VFE.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
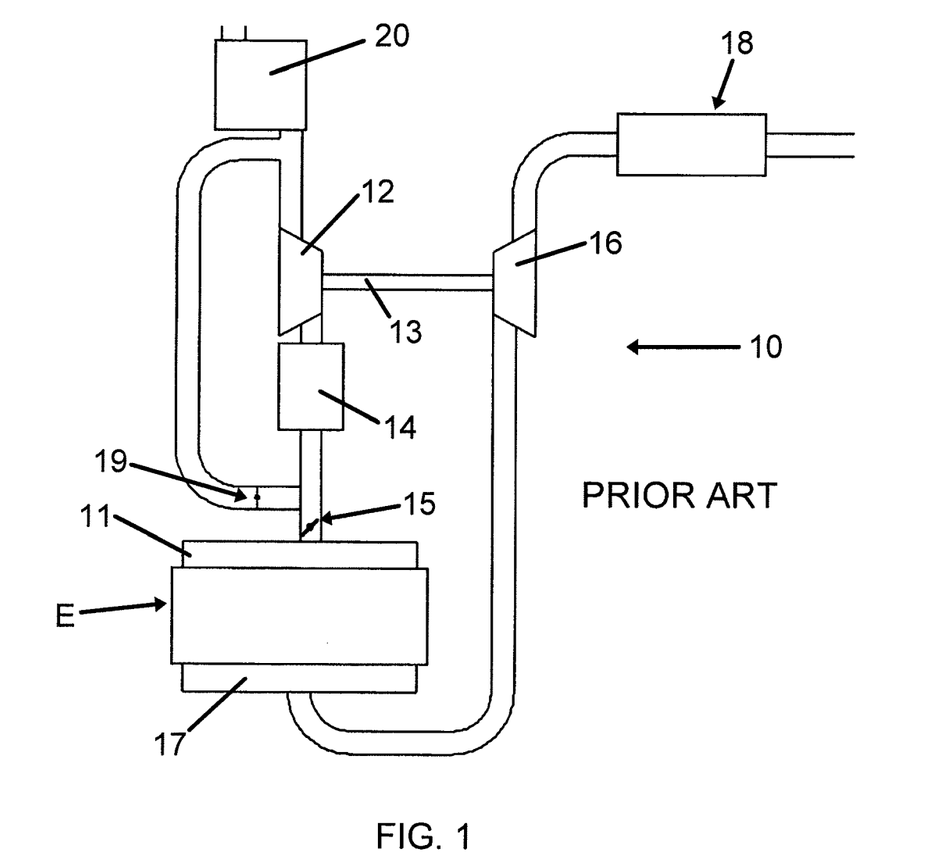
FIG. 1 is a diagrammatic illustration of a turbocharged engine system in accordance with the prior art.

FIG. 1 depicts a typical turbocharged engine system in accordance with the prior art. The system includes an airthrottled internal combustion engine E and a turbocharger system 10. The engine includes an intake system having an intake manifold 11 that receives air for distribution to the cylinders, along with fuel that is mixed with the air either outside or inside the cylinders to form a fuel-air mixture that is combusted within the cylinders by ignition from spark plugs or the like. The turbocharger system 10 includes a compressor 12 that receives air from an air cleaner 20 and compresses the air for supply to the intake manifold 11. If desired, an intercooler 14 can be provided for cooling the compressed air before it is supplied to the intake manifold 11. A throttle 15 is provided upstream of the intake manifold 11, and is operable to control the mass flow of air being drawn into the engine. The compressor 12 typically is rotatably driven by a turbine 16 connected to the engine exhaust manifold 17. The compressor 12 and turbine 16 are mounted on the same shaft 13. Exhaust gas is expanded across the turbine and discharged to an exhaust system 18. A bypass valve 19 can be provided in the air intake to bypass air back to a point upstream of the compressor, usually immediately after the air cleaner 20, in the event of a sudden buildup of pressure after the compressor 11, such as when the throttle 15 is suddenly closed. The turbine 16 can include a waste gate or bypass valve (not shown) for bypassing exhaust gas around the turbine in certain operating conditions.

One of the challenges during steady-state operation of the prior-art system at part load is that the throttle is in a relatively closed position, which means that the air mass flow rate through the engine is relatively low. This results in low energy in the exhaust, and consequently the turbine 16 does not run fast enough and imposes a relatively high back pressure on the engine, leading to relatively large pumping losses and deteriorated performance of the engine. Additionally, on the intake side energy is lost across the throttle 15 because of the pressure drop across the throttle. This increases the cycle suction losses, further adversely affecting engine performance.

Furthermore, during dynamic operation, one of the challenges is the inability of the turbocharger to rapidly increase boost pressure when a demand for a rapid increase in engine power is made. This is especially pronounced when the engine is operating in a part-throttle mode where the exhaust flow and energy levels are low. The turbine 16 does not gain speed rapidly, resulting in a slow buildup of boost pressure, a phenomenon generally known as "turbo lag". With the everincreasing demand for improved performance and reduced emissions, there is a need for a solution to improve turbocharger steady-state and dynamic performance.

The improved turbocharger system described herein derives energy from the intake air flow, which would have otherwise been lost in the throttle, and feeds this energy to the turbocharger to improve its steady-state and dynamic performance.

Figure 2:
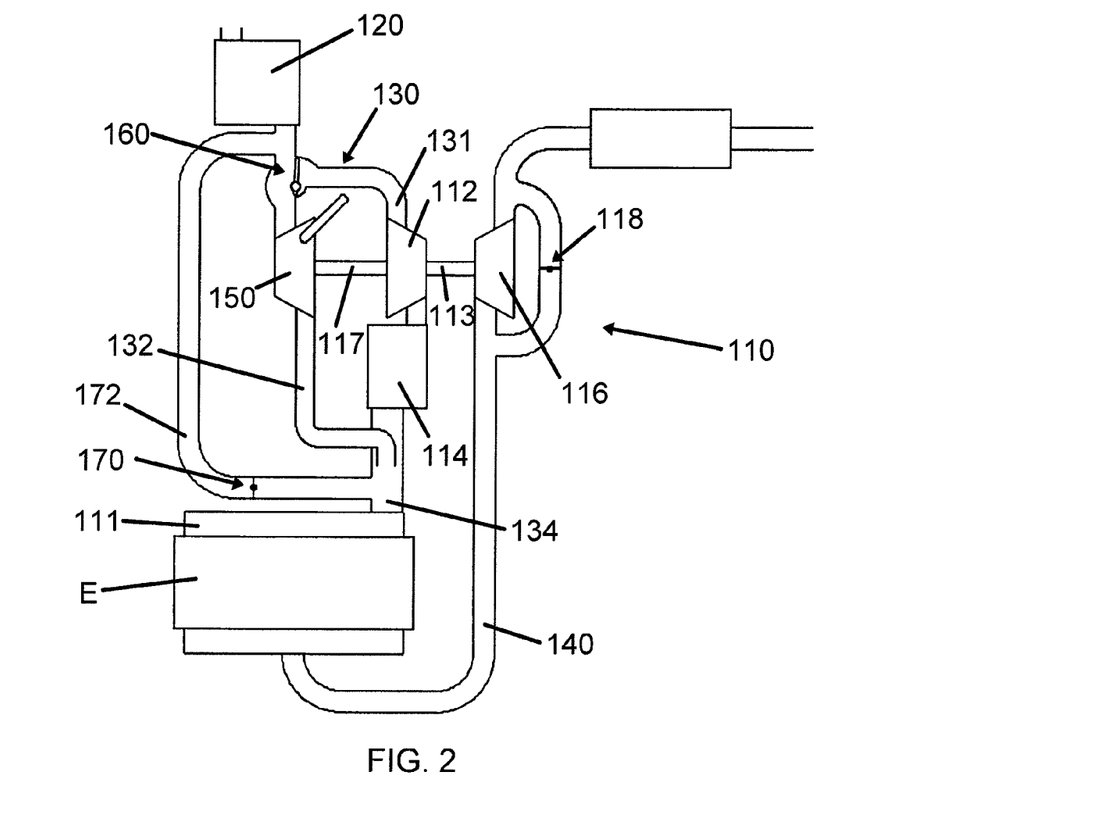
FIG. 2 shows a turbocharger system in accordance with one embodiment of the invention.

With reference to FIG. 2, a turbocharger system 110 in accordance with one embodiment of the present invention is illustrated. The turbocharger system includes a compressor 112 and a turbine 116 mounted on a shaft 113. The compressor 112 is disposed in the engine's intake air conduit system 130, and in particular is disposed in a first branch 131 of the intake air conduit system, through which air is supplied to the compressor after first passing through an air cleaner 120. An intercooler 114 can be disposed in the first branch 131 downstream of the compressor 112. The turbine 116 is disposed in the engine's exhaust conduit system 140. The turbocharger system includes a variable flow expander 150, referred to herein as a VFE. The VFE 150 is disposed in a second parallel branch 132 of the intake air conduit system. Branches 131 and 132 diverge at a point downstream of the air cleaner 120 and rejoin each other at a point downstream of the intercooler 114 where they feed into the intake flow pipe 134 that leads into the engine's intake manifold 111.

The VFE can comprise a variable expansion ratio turbine, in which the variation in expansion ratio is accomplished by suitably adjusting the flow area, air flow velocity, and angle of air incident on the turbine blades. For example, the VFE can comprise a variable nozzle turbine (VNT) or a turbine having a slidable piston or sleeve for adjusting the flow area leading into the turbine wheel of the VFE. The VFE replaces the usually required air throttle (e.g., throttle 15 in the prior art system of FIG. 1) by providing the same functionality of air flow control. This is achieved by regulating the degree of expansion of the air in the VFE (by adjusting the variable nozzle or piston of the VFE) to achieve the desired pressure and temperature, and hence density, of the air discharged from the VFE, thereby providing the desired mass flow rate of air to the engine. The expanding air performs work on the turbine of the VFE and generates mechanical power that is fed to the turbocharger via a shaft 117 that is coupled to the turbocharger.

An apportioning valve 160 is included for variably apportioning the total air flow between the VFE 150 and the compressor 112. The apportioning valve 160 is located at the point where the branches 131 and 132 of the intake conduit system diverge. Thus, the apportioning valve 160 receives the total air flow from the air cleaner 120 and then splits the air into two portions, one portion going to the VFE and the remainder going to the compressor. The position of the apportioning valve can be regulated by a suitable actuator (not shown) controlled by a controller (not shown) so as to pass a predetermined portion of the air through the VFE and the remaining air through the compressor to achieve the required air mass flow rate and density conditions at the intake manifold 111 of the engine.

Figure 3:
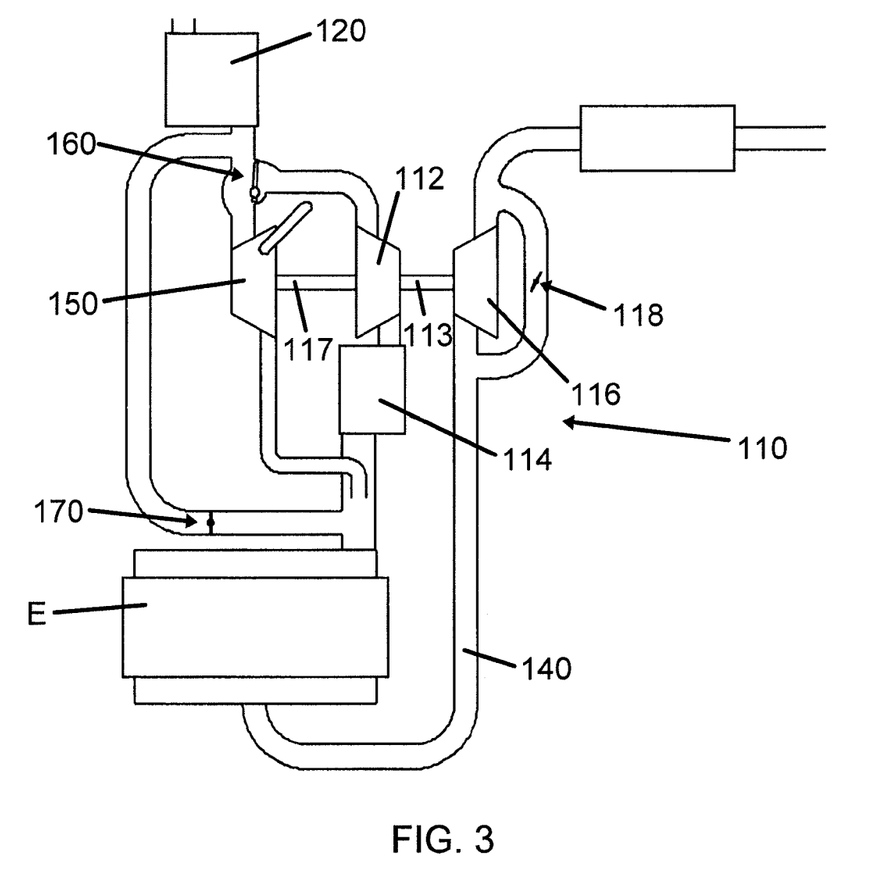
FIG. 3 shows the turbocharger system of FIG. 2 in a non-boost mode of operation.

With respect to FIG. 3, when the engine is operating at part load, the apportioning valve 160 diverts most of the air flow through the VFE. The degree of expansion in the VFE determines the temperature and pressure, and hence density, of the out-flowing air needed to achieve the demanded mass flow of the engine. The air is introduced to the intake pipe 134 prior to the intake manifold 111. Depending on the degree of expansion of the air flowing through the VFE, mechanical power is generated at the VFE shaft 117. The mechanical power so generated is fed to the turbine 116 through the turbocharger shaft 113. This helps to keep the turbine 116 in motion and helps to scavenge exhaust gases from the engine, thereby reducing the back-pressure on the engine and hence improving engine performance. The turbine may also be provided with a bypass arrangement, such as a waste gate 118, if needed.

Figure 4:
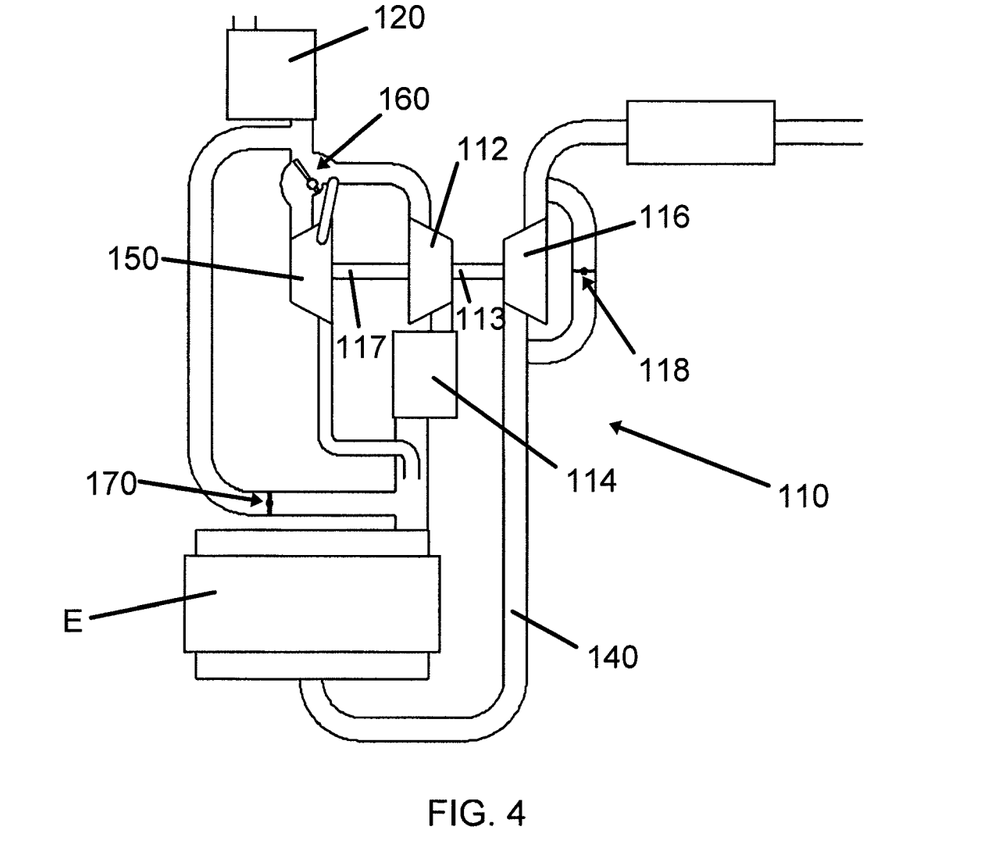
FIG. 4 shows the turbocharger system in a boost mode of operation.

With respect to FIG. 4, when the engine is operated at full load, the apportioning valve 160 is positioned such that a majority of the total mass flow rate of air passes through the compressor 112 to meet the high air demand, while a very small amount of air flows through the VFE 150. In this operating condition, the energy for operating the compressor is derived from the energy extracted by the turbine 116 from the engine exhaust gases. During transition from part load to full load, the apportioning valve 160 and VFE 150 are operated in a mutually cooperative manner so that power initially flows from the VFE to the turbine 116 to accelerate the turbine. Upon achieving a reasonable operating turbocharger speed, the apportioning valve 160 progressively deactivates the VFE and most of the air flows through the compressor 112. In this condition, power flows from the turbine 116 to the compressor 112 through the turbocharger shaft to achieve the required boost pressure and air flow. The temperature of the air emerging from the compressor may be lowered by the interposition of intercooler 114, if required by the engine. A bypass valve 170 can be provided in the intake air conduit system to permit safe pressure release in the event that the pressure in the intake manifold 111 exceeds safe operating limits. The bypass valve 170 is disposed in a bypass conduit 172 that branches off from the intake pipe 134 and connects at its opposite end to the intake conduit upstream of the apportioning valve 160. The bypass valve can also serve as a backup air throttle in the event of failure of other components in the system. The bypass conduit 172 is also advantageous in that it allows air flow to the engine in the event that the apportioning valve or any of the systems downstream fail to function as expected.

When the engine operates in a condition where boosting is not required (such as a part-load condition), most of the air is routed through the VFE by suitably positioning the apportioning valve 160. This is illustrated in FIG. 3. The expansion ratio of the VFE is adjusted to achieve the demanded air flow. The power generated by the VFE is fed to the turbocharger shaft and keeps the turbine in motion. The exhaust from the engine may be routed to the turbine 116 or may be bypassed around the turbine by operating the waste gate valve 118 to achieve minimum exhaust back-pressure and optimum engine performance.

When the engine is operated in a condition requiring pressurized air in the intake system, the apportioning valve 160 is positioned to route most of the air through the compressor, as illustrated in FIG. 4. The boosted air may be routed through intercooler 114 if the temperature at the outlet of the compressor is above the acceptable range for engine operation. The exhaust gases from the engine are passed through the turbine 116 and the power so generated is fed to the compressor for satisfactory and stable operation.

Under dynamic operation, there may be a need to rapidly move from non-boosted to boosted operation. In such situations, the apportioning valve 160 and VFE can be operated in a predetermined manner to generate more power in the VFE to rapidly accelerate the compressor 112. Initially a predetermined portion of the air from the air cleaner 120 is passed through the VFE to generate energy for accelerating the compressor. The remaining portion of the air is routed through the compressor to generate pressurized air. The apportioning valve 160 is then progressively moved to progressively increase the air flow to the compressor and decrease the air flow to the VFE. In this manner, the turbocharger system is able to more-rapidly achieve the desired boost for the engine. The compressor acceleration is also assisted by the progressively increasing energy from the turbine.

Figure 5:
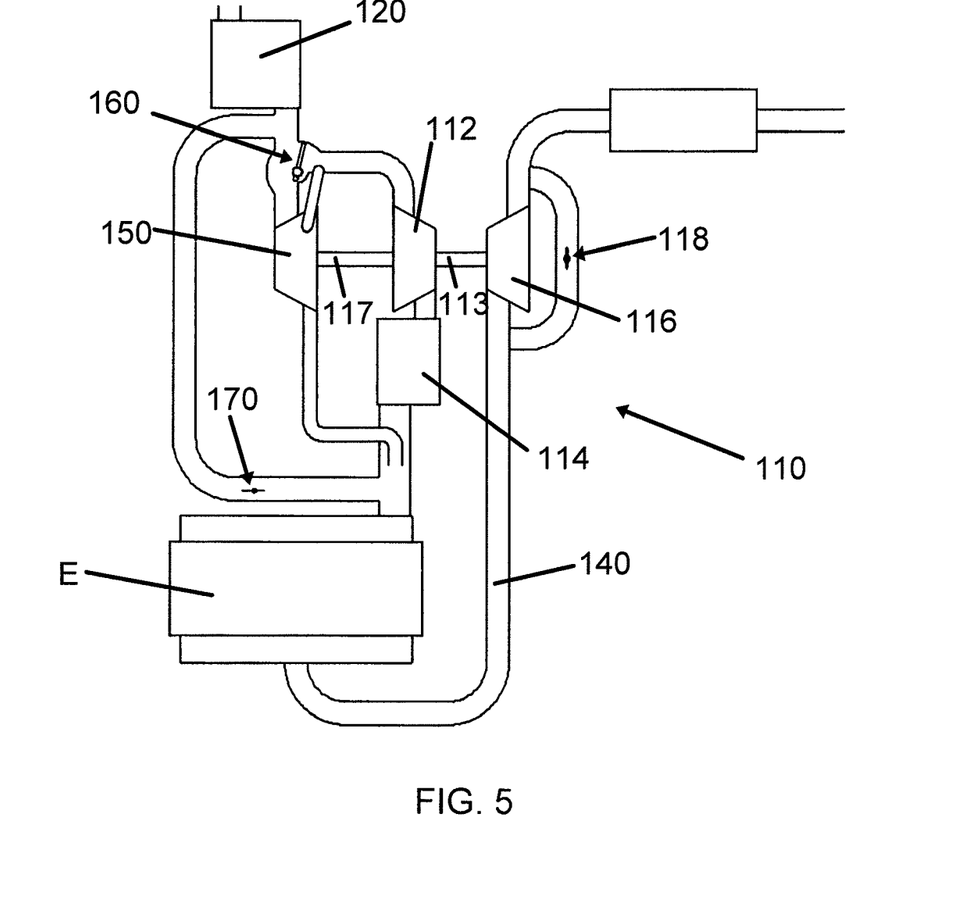
FIG. 5 shows the turbocharger system at a moment in time during a rapid transition from a boost mode to a non-boost mode of operation.

In situations where the boost generated by the turbocharger is more than needed by the engine, there would be a need to rapidly move from boosted to non-boosted operation. In such situations, the apportioning valve 160 is rapidly operated to route most of the air from the air cleaner into the VFE 150. The VFE is appropriately adjusted to supply the required air to the engine. The excess boost pressure that is temporarily generated is rapidly relieved by temporarily opening the bypass valve 170. At the same time, power from the turbine 116 can also be reduced by operating the waste gate valve 118 to bypass exhaust gas around the turbine.

Many modifications and other embodiments of the inventions set forth herein will come to mind to one skilled in the art to which these inventions pertain having the benefit of the teachings presented in the foregoing descriptions and the associated drawings. For example, the invention may have applicability to air-throttled devices boosted by a compressor driven by means other than an exhaust-gas-driven turbine. Thus, the invention includes embodiments such an air supply system for an air-throttled device (e.g., an internal combustion engine), comprising an intake air conduit system for supplying intake air to the device, a compressor disposed in the intake air conduit system and operable for compressing air received from the intake air conduit system and supplying the compressed air through the intake air conduit system to the device, a variable-flow expander (VFE) mechanically coupled to the compressor and arranged in the intake air conduit system in parallel with the compressor, and an apportioning valve arranged in the intake air conduit system upstream of the compressor and the VFE, the apportioning valve being variably positionable for variably apportioning the air flowing in the intake air conduit system between the compressor and the VFE.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger system for an air-throttled internal combustion engine having an intake air conduit system for supplying intake air to the engine, the intake air having a mass flow rate of air within the intake air conduit system, and an exhaust conduit system for exhausting combustion gases from the engine, the turbocharger system comprising:

a turbocharger comprising a compressor disposed in the intake air conduit system and operable for compressing air received from the intake air conduit system and supplying the compressed air through the intake air conduit system to the engine, and a turbine disposed in the exhaust conduit system and operable for expanding exhaust gases received from the exhaust conduit system so as to extract power from the exhaust gases, the turbine being mechanically coupled to the compressor for rotatably driving the compressor;

a variable-flow expander (VFE) mechanically coupled to the turbocharger and arranged in the intake air conduit system in parallel with the compressor, the VFE comprising a variable expansion ratio turbine arranged so that one portion of the mass flow rate of air flowing in the intake air conduit system is compressed by the compressor and is supplied to the engine and a remaining portion of the mass flow rate of air in the intake air conduit system passes through the variable expansion ratio turbine and is expanded therein and is supplied to the engine, such that the variable expansion ratio turbine generates mechanical power that is fed to the turbocharger via a shaft that is coupled to the turbocharger, said mechanical power assisting the rotation of the turbocharger, the variable expansion ratio turbine being controllable to regulate the flow rate of air therethrough and thereby vary an amount of expansion of the air; and an apportioning valve arranged in the intake air conduit system upstream of the compressor and the VFE, the apportioning valve being variably positionable for variably apportioning the mass flow rate of air flowing in the intake air conduit system between the compressor and the VFE that is in relation to a boost mode of the turbocharger during operation of the engine.

2. The turbocharger system of claim 1, wherein the variable expansion ratio turbine comprises a variable nozzle turbine.

3. The turbocharger system of claim 1, wherein the apportioning valve is structured and arranged to be positionable in a first position, in a second position, and in a plurality of positions therebetween, wherein the first position causes a majority of the mass flow rate of the air flowing in the intake air conduit system to be supplied to the VFE and thus bypass the compressor, and wherein the second position causes a majority of the mass flow rate of the air flowing in the intake air conduit system to be supplied to the compressor and thus bypass the VFE.

4. The turbocharger system of claim 1, further comprising a bypass passage connecting a portion of the intake air conduit system downstream of the compressor and the VFE with a portion of the intake air conduit system upstream of the apportioning valve, whereby the bypass passage allows air flow to the engine in the event that the apportioning valve fails to function.

5. The turbocharger system of claim 4, further comprising a bypass valve disposed in the bypass passage, the bypass valve being movable between open and closed positions respectively allowing and preventing air flow through the bypass passage.

6. A method for operating a turbocharger that boosts performance of an air-throttled internal combustion engine, the engine having an intake air conduit system for supplying intake air to the engine, the intake air have a mass flow rate of air within the intake air conduit system, and an exhaust conduit system for exhausting combustion gases from the engine, the turbocharger comprising a compressor disposed in the intake air conduit system and operable for compressing air received from the intake air conduit system and supplying the compressed air through the intake air conduit system to the engine, and a turbine disposed in the exhaust conduit system and operable for expanding exhaust gases received from the exhaust conduit system so as to extract power from the exhaust gases, the turbine being mechanically coupled to the compressor for rotatably driving the compressor, the method comprising the steps of:

providing a variable-flow expander (VFE) mechanically coupled to the turbocharger and arranged in the intake air conduit system in parallel with the compressor, the VFE comprising a variable expansion ratio turbine arranged so that one portion of the air flowing in the intake air conduit system is compressed by the compressor and is supplied to the engine and a remaining portion of the air in the intake air conduit system passes through the variable expansion ratio turbine and is expanded therein and is supplied to the engine, such that the variable expansion ratio turbine generates mechanical power that is fed to the turbocharger via a shaft that is coupled to the turbocharger, said mechanical power assisting the rotation of the turbocharger;

controlling the variable expansion ratio turbine to regulate the flow rate of air therethrough and thereby vary an amount of expansion of the air; and variably apportioning the air flowing in the intake air conduit system between the compressor and the VFE that depends on the turbocharger during operation of the engine being in at least one of a non-boost mode and a boost mode and a part-load operation and a transition mode.

7. The method of claim 6, wherein when the turbocharger is operated in the non-boost mode, the variable apportioning step further includes a sub-step of apportioning a majority of the mass flow rate of air flowing in the intake air conduit system to the VFE, and controlling the VFE such that the VFE extracts power from the air and assists the rotation of the turbocharger.

8. The method of claim 7, wherein when the turbocharger is operated in the non-boost mode, the method further includes a step of bypassing the exhaust gas from the engine around the turbine of the turbocharger.

9. The method of claim 6, wherein when the turbocharger is operated in the part-load operation, said mechanical power fed to the turbocharger from the VFE results in improved exhaust gas scavenging from the engine which reduces backpressure on the engine.

10. The method of claim 6, wherein when the turbocharger is operated in the boost mode, the variably apportioning step further includes a sub-step of flowing a majority of the mass flow rate of air in the intake air conduit system to the compressor.

11. The method of claim 6, wherein when the turbocharger is operated in the transition mode the turbocharger is transitioned from the non-boost mode to the boost mode by the steps of:

initially passing a portion of the air flowing in the intake air conduit system through the VFE so as to cause the VFE to add power to the turbocharger to accelerate the compressor, and using the compressor to compress the remainder of the air supplied to the engine; and progressively reducing the mass flow rate of the air to the VFE while increasing the mass flow rate of the air to the compressor.

12. The method of claim 6, wherein when the turbocharger is transitioned from the boost mode to the non-boost mode by the steps of:

apportioning a majority of the mass flow rate of the air to the VFE and regulating the VFE to supply the air to the engine; and relieving excess boost pressure produced by the compressor by temporarily diverting compressed air from a portion of the intake air conduit system downstream of the compressor to a portion of the intake air conduit system upstream of the compressor and the VFE.

13. The method of claim 12, wherein when the turbocharger is transitioned from the boost mode to the non-boost mode further comprises a step of bypassing exhaust gas around the turbine of the turbocharger so that the turbine of the turbocharger's output is reduced by flowing the exhaust gas of the engine through a valve.

* * * * *